Patented Sept. 22, 1936

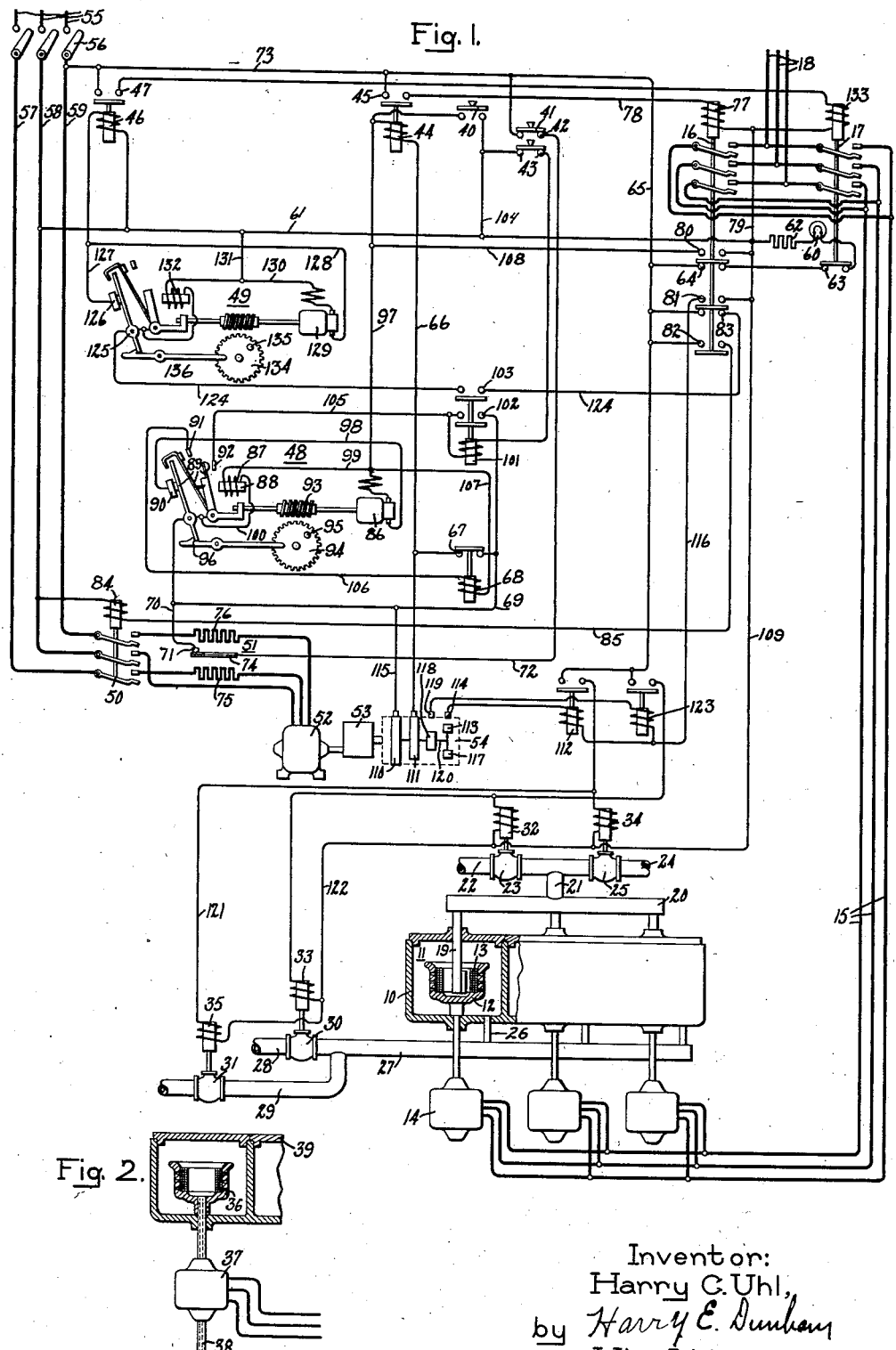

2,055,323

UNITED STATES PATENT OFFICE 2,055,323

PROCESSING SYSTEM FOR RAYON AND THE LIKE

Harry C. Uhl, Atlanta, Ga., assignor to General Electric Company, a corporation of New York Application December 18, 1934, Serial No. 758,149

1 Claim. (Cl. 18—8)

The present invention relates to processing systems for rayon and the like and has for its object the provision of an improved arrangement for automatically subjecting rayon or like fibrous material to several steps of a process whereby the various steps are carried out automatically in their proper sequence during predetermined periods of time.

For a consideration of what I believe to be novel and my invention, attention is directed to the following description and the claim appended thereto in connection with the accompanying drawing.

In the drawing I have shown, by way of example, in Fig. 1 an automatic control arrangement as may be used for processing rayon cakes in accordance with my invention, and in Fig. 2 a modification of a part of the arrangement of Fig. 1.

The particular process itself to which the rayon cakes are subjected comprises the following steps:
1. Preliminary washing of the rayon cakes;
2. Desulphurizing of the rayon cakes;
3. Final washing of the cakes; and
4. Wringing the cakes.

The process is preferably carried out while the rayon cakes are rotated at high speed in buckets having perforated walls. Each step or treatment is carried out during a definite time period, for example, in a certain case the rayon cakes are subjected to a preliminary washing treatment for 5 minutes, a desulphurizing treatment for 27 minutes, a final washing for 7 minutes, and a wringing period for about 1 minute. As stated before, the treatment is performed preferably while the cakes are rotated in buckets. These buckets are driven by motors. At the beginning of the operation the motors have to be accelerated and at the end of the operation the motors have to be plugged. The acceleration of the motors may take about 10 seconds and the plugging or stopping may take about 15 seconds.

The arrangement according to my invention is entirely automatic. All the operator has to do is to press a push button to initiate the above mentioned cycle of treatments or steps and at the end of the cycle to replace the treated rayon cakes by other cakes to be treated. The end of the cycle is indicated by a telltale lamp which also indicates the readiness of the apparatus for a new cycle.

The arrangement as shown in the drawing comprises a container 10 forming a plurality of chambers 11. A bucket 12 for receiving a rayon cake 13 to be treated is disposed in each chamber. Each bucket is driven by a motor 14 connected through a line 15, a line or forward contactor 16 and a plugging or reverse contactor 17 to a source of electric energy 18. Liquids or like agents, in the present instance water and a desulphurizing agent or liquid, are conducted to the buckets 12 through nozzles 19 receiving the agents from a conduit 20 which is connected through a connection 21 to another conduit having a conduit portion or branch 22 with an automatically operated valve 23 connected to a source of desulphurizing liquid, and another portion or branch 24 having a valve 25 connected to a suitable source of water. By an automatically operated valve I mean a valve operated by a solenoid, a motor, or a thrustor. Both valves 23 and 25 are normally closed. Opening of the valve 23 causes desulphurizing liquid or agent to be sprayed into the buckets 12 through the nozzle 19, and opening of the valve 25 causes water to be sprayed into the buckets 12. During the operation these agents, in the present instance water and desulphurizing liquid, penetrate the cakes or rayon 13 by the action of centrifugal force and are discharged therefrom through perforations in the buckets into the chambers 11 of the container 10. The liquids are discharged from said chambers through pipes 26 connected to a conduit 27 having branches 28 and 29, each of these branches including in the present instance a valve 30 and 31 respectively. The purpose of this arrangement is to permit the separate collecting of discharged water and desulphurizing liquid whereby the latter may be regained. The arrangement is such that both valves 23 and 30 for controlling the supply and the discharge respectively of desulphurizing liquid are opened and closed simultaneously. This is accomplished by the provision of automatic means such as motors, thrustors or solenoids 32 and 33 connected in parallel for operating the valves 23 and 30 respectively. Similarly, parallel connected motors, thrustors, or solenoids 34 and 35 are provided for simultaneously opening and closing the valves 25 and 31 for supplying and discharging respectively of water.

At the beginning of each cycle of operation the nozzles 19 together with the cover of the tank or container 10 and the conduit 20 are lifted by a hoist or the like, not shown, to permit the removal of the treated cakes and the placing of cakes to be treated in the buckets.

The lifting of the nozzles 19 and of the conduit 22 may be eliminated by an arrangement as indicated in the modification of Fig. 2 in which water and desulphurizing agent or the like are conducted to a bucket 36 driven by a motor 37 through a bore 38 in the motor shaft. In an arrangement of this kind, replacing of cakes in the bucket 36 is accomplished by removing a cover 39 of the container for the bucket.

Referring again to Fig. 1, the operation of the arrangement described above comprises the following steps:
1. Starting and accelerating the motors 14.

2,055,323

2. Opening the water supply and discharge valves 25 and 31 for a predetermined period of time to effect preliminary washing of the cakes;

3. Opening the valves 23 and 30 for a predetermined period of time to effect desulphurizing of the cakes;

4. Opening again the valves 25 and 31 to effect final washing for a predetermined period of time;

5. Wringing the cakes, that is, driving the buckets for another definite period of time to effect drying of the cakes; and finally 6. Plugging the motors to bring them to a quick stop.

As stated in the beginning, all these steps are carried out entirely automatically. The apparatus for doing this comprises in addition to the aforementioned elements a push button 40, a safety stop switch 41 having contacts 42 and 43, a line contactor relay 44 having contacts 45, a plugging contactor relay 46 having contacts 47, a bridging time delay relay 48, a plugging time delay relay 49, a pilot motor contactor 50, a thermal relay 51, a pilot motor 52 for driving through a gearing 53, a drum contactor 54 and various other relays and interlocking and holding contacts which will be described hereinafter.

The arrangement will best be understood by considering its operation. As stated above, the motors are supplied with energy from a source 18. All other devices are connected to a source 55 through a switch 56 and means including line conductors 57, 58, and 59. Closing of the switch 56 causes lighting up of a telltale lamp 60, the circuit of which can be traced from the line conductor 58 through a conductor 61, a resistor 62, a pair of contacts 63 closed by the plugging contactor 17, a pair of contacts 64 closed by the line contactor 16 and a conductor 65 to the line conductor 59. Lighting up of the telltale lamp 60 indicates the availability of power for the control circuit and that the apparatus is in a position ready for operation. The only manipulation to be performed thereafter by the operator, aside from placing cakes into the buckets, is the pressing of the start push button 40. Closing of the push button 40 effects energization and closing of the forward contactor relay 44. Its circuit may be traced from the line conductor 58 to conductor 61, the push button 40, the coil of the relay 44, a conductor 66, contacts 67 of a relay 68, a conductor 69, a conductor 70, contacts 71 of the thermal relay 51 for the pilot motor 52, a conductor 72, contacts 42 of the safety stop push button 41 and a conductor 73, back to the other line conductor 59 of the line. As will be readily seen, the circuit 44 is interrupted when the safety push buttons 42 are opened or when the relay 68 or the thermal relay 51 opens. The thermal relay 51 is normally closed and opens only in case an excessive current is drawn by the pilot motor 52 for driving the drum contactor 54. The kind of thermal relay 51 used in the present instance is well known in the art. It includes a bimetallic strip 74 exposed to the heat produced by two resistors 75 and 76 connected in two phases respectively of the pilot motor 52.

Energization of the coil for forward contactor relay 44 causes closing of the contacts 45 and thus establishes a circuit for an operating coil 77 of the forward or line contactor 16. The circuit for the coil 77 may be traced from the line conductor 59 through the conductor 73, contacts 45, a conductor 78, the coil 77, a conductor 79 and finally the conductor 61 back to the other line conductor 58. Energization of the coil 77 of the line contactor causes closing of the latter, establishing a circuit for the motors 14 driving the buckets. The latter receive energy, as stated before, from a source 18 through the conductors 15. The source 18 may be the same as the source 55 or a different source may be used. The line contactor 16 has interlocks or contacts 80, 81, and 82 which are closed as the contactor is closed, and the aforementioned contacts 64 and interlocks 83, both of which are opened as the contactor closes. The interlock or interlocks 80 bridge the contacts of the start push button 40, thereby holding the circuit for forward contactor relay 44 closed as the start push button 40 is opened or released. The forward contactor relay 44 in turn holds the line contactor 16 closed as described above.

Closing of the interlock 82 establishes a circuit for a coil 84 of the pilot motor contactor 50, which latter thereby closes. The circuit for the coil 84 may be traced from the line conductor 58 through the coil 84, a conductor 85, the interlock 82 and the conductor 73 to the other line conductor 59. Starting of the pilot motor 52 causes rotation of the drum contactor 54, thus initiating the first step of processing the rayon cakes.

The closing of the forward contactor 44 simultaneously causes energization and operation of the bridging time delay relay 48. The kind of time delay relay diagrammatically indicated in the drawing is well known in the art. Its purpose is to open or close a circuit after the lapse of a predetermined period of time. Its essential parts are a small synchronous motor 86, a solenoid 87 surrounding a magnetic plunger 88, three contacts 89 which are electrically connected by levers or contact-making members, a contact 90 cooperating with one of the contacts 89 and contacts 91 and 92 cooperating with the others of the three contacts 89. Furthermore, the relay includes a worm 93 and a time disk 94 having a pin 95, and a latch mechanism including a lever 96. With the coil of the line contactor relay 44 closed, a circuit for the synchronous motor 86 of the bridging time delay relay 48 may be traced from the line conductor 58 through the conductor 61, the start push button 40, a conductor 97, or in case the push button is already open, through a conductor 109, contact 80, a conductor 108, to the conductor 97, the motor 86, a conductor 98, the contacts 90, 89, the conductor 70, the contacts 71 of the thermal relay 51, the conductor 72, the contacts 42, back through the conductor 73 to the other line conductor 59. The solenoid 87 is simultaneously energized with the motor 86 because it is connected to the latter in parallel, its circuit including a conductor 99, a conductor 100 and the conductor 70. The essential difference between the circuits for the synchronous motor 86 and the solenoid 87 is that the circuit for the motor includes the contacts 89, 90 so that opening of the latter deenergizes the motor but does not deenergize the solenoid. During operation of the bridging time delay relay 48, energization of the solenoid 87 causes engagement of the contacts 89 and 92 and simultaneously engagement between the timing gear 49 and the worm 93. Rotation of the timing gear 94 then effects after a definite period of time engagement between the pin 95 of the timing gear and the lever 96, causing the latter to unlatch and thereby effecting opening of the contacts 89, 90, resulting in deenergization of the motor 86, and closing of the contacts 89, 91, and 92. Closing of the contacts 89, 92, of the bridging time delay relay 48 effects energization of a sequence relay 101, which latter then closes its contacts 102 and 103. The circuit for the coil of the sequence relay 101 may be traced from the line conductor 58, through the conductor 61, a conductor 104, the contacts 43 of the safety stop push button 41, the coil of the sequence relay 101, a conductor 105, the contacts 92, 89, the conductor 70, the contacts 71, the conductor 72, the contacts 42 of the safety stop push button and finally the line 73 back to the other line conductor 59.

Closing of the contacts 89, 91 of the bridging time delay relay causes energization of the coil for the bridging relay 68, which latter then opens the contacts 67. The circuit for the coil of the bridging relay 68 may be traced from the line conductor 59 through the conductor 73, the contacts 42 of the safety stop push button, the conductor 72, the contacts 71, the conductor 70, the contacts 89, 91, a conductor 106, the coil of the bridging relay 68, the conductor 107, the conductor 97, a conductor 108, interlock 80, a conductor 109, and through conductor 61 back to the other line conductor 58.

The bridging relay 68 when closed bridges two contacts 110 and 111 of the drum contactor 54. As the contacts 67 of the bridging relay 68 were included in the circuit for the coil of the line contactor relay 44, the current in this circuit after opening of the contact 67 is forced through the contacts 111 and 110 of the drum contactor. Hence, the new circuit established for the line contactor relay 44 may be traced from the line conductor 58 through the conductor 61, the conductor 109, the interlock 80, the conductor 108, the conductor 97, the coil of the relay 44, the conductor 66, the drum contacts 111 and 110, a conductor 115, the conductor 69, the conductor 70, the contacts 71, the conductor 72, the contacts 42 and finally through conductor 73 to the other line conductor 59.

As stated above, the circuit for the coil of the sequence relay 101 includes contacts 92. This circuit, however, is sealed by a holding circuit including the contacts 102 of the sequence relay, thus holding the sequence relay closed after opening of the contacts 92 as long as control power is on or until the safety push button or emergency selector switch 41 is turned to safe stop position. Operation of the thermal overload relay 51 would also deenergize the coil of the sequence relay 101.

Assuming that the motors 14 for driving the buckets were started while the drum contactor 54 was in starting position, then after the lapse of about 10 seconds, which are allowed for speeding up of the motors 14, the drum contactor 54 is rotated an amount sufficient to cause operation of the water valves, thus starting the preliminary washing period which, as pointed out above, may last about 5 minutes. This is accomplished by a relay 112 for closing the circuit of the solenoids, motors or thrustors 34 and 35 of the water control valves 25 and 31. The coil of the relay 112 is energized through a contact 113 and a finger 114 on the drum contactor 54. The circuit for the operating coil of the relay 112 may be traced from the line conductor 59 through the conductor 73, the contacts 42 of the safety stop push button, the conductor 72, the contacts 71 of the thermal relay 51, the conductor 70, the conductor 69, the conductor 115, the main contact 110 of the drum contactor 54, the contact 113, the finger 114, the coil of the relay 112, a conductor 116, the interlock 81, the conductor 109 and finally through the conductor 61 to the other line conductor 58. It is here noted that the drum contactor in addition to the aforementioned contacts also includes two other contacts 117 and 118, the first being in alinement with the finger 114 and the second being in alinement with a finger 119. All of the contacts on the drum contactor are electrically connected by a connection 120. Closing of the relay 112 causes energization of the solenoid, motor, or thrustor-operated water valves. The circuit for the latter may be traced from the line conductor 59 through the conductor 73, the contacts of the relay 112, the coil 34 of the water supply valve 25, the conductor 109, and finally through the conductor 61 to the other line conductor 58. The operating coil 35 for the water discharge valve 31 is connected in parallel to the coil 34 of the solenoid, motor or thrustor-operated valve 25 by conductors 121 and 122. At the end of the preliminary washing period the relay 112 is deenergized, the contact 113 of the drum contactor 54 leaving the finger 114, causing opening of the relay 112 and accordingly deenergizing and closing of the solenoid, motor, or thrustor-operated valves 25 and 31 for supplying water to the buckets and discharging the water from the container 10 respectively.

At the end of the preliminary washing period the desulphurizing period is initiated by engagement of the drum contactor finger 119 with the contact 118. This closes the circuit of the operating coil of a relay 123. The circuit for this coil may be traced similarly to the circuit of the coil for the relay 112. As can be readily seen in the drawing, one end of each coil is connected to the conductor 116, the other end of the coil 123 is connected to the finger 119, whereas the other end of the coil 112 is connected to the finger 114 of the drum contactor 54. The relay 123 with its operating coil energized closes the circuit of the solenoid, motor, or thrustor-operated valves 23 and 30 for controlling the supply of desulphurizing liquid to the buckets and the discharge of desulphurizing liquid from the container 10. The circuit for the solenoid, motor, or thrustor-operated valves 23 and 30 may be traced similarly to the tracing of the circuits for the solenoid operated water control valves 25 and 31. One end of the four solenoids is connected to the conductor 122 and the other ends of the solenoids, motors, or thrustors 34 and 35 are connected to the contacts of the relay 112, whereas the two other ends of the solenoids, motors, or thrustors 32 and 33 are connected to the contacts of the relay 123.

Desulphurizing liquid or agent is conducted to the buckets and discharged from the tank or container 10 as long as the finger 119 of the drum contactor 54 is in engagement with the contact 118, the desulphurizing period in the present instance lasting about 27 minues. At the end of this period the valves 23 and 30 are closed. The final washing period then begins. The finger 114 engages the contact 117 of the drum contactor, thereby closing the circuit of the operating coil of the relay 112, which in turn closes the circuit of the solenoids, motors or thrustors 34 and 35. The final washing period lasts about 7 minutes, ending as the contact 117 leaves the finger 114 of the drum contactor 54.

At the end of the final washing period the motors 14 continue running for about 1 minute to wring the rayon cakes in the buckets, that is, causing drying thereof.

At the end of the wringing or drying period the drum contactor has reached the end of the cycle and causes breaking of the circuit of the line contactor relay 44. The circuit of the latter, as stated above, includes the segments 111 and 110 of the drum contactor 54. As the segment 111 leaves its finger it opens the circuit of the line contactor relay 44, causing the relay to open contacts 45. Opening of contacts 45 causes deenergizing of the operating coil 77 of the line contactor 16 whereby the latter opens. This causes, simultaneously, opening of the interlock 82 which is in the circuit of the operating coil 84 for the pilot motor contactor 50. The circuit for coil 84 being opened causes deenergization of the operating coil 84 and accordingly opening of the pilot motor contactor 50. The pilot motor 52 then stops. Opening of the line contactor 16 also causes closing of the interlock 83. This completes the circuit for the plugging time delay relay 49. The relay 49 is substantially similar to the relay 48. Its circuit may be traced from the line conductor 59 through the conductor 73, the interlock 83, a conductor 124, the contacts 103 of the sequence relay 101, contacts 125, 126 a conductor 127, a conductor 128, a synchronous motor 129 corresponding to the motor 86 of the bridging time delay relay 48, a conductor 130, and finally through a conductor 131 and the conductor 61 to the other line conductor 58. A solenoid 132 of the plugging time delay relay, similar to the solenoid 87 of the bridging time delay relay, is connected in parallel to the motor 129. One end of the solenoid 132 is connected to the conductor 131 and the other end is connected to the conductor 124. The two circuits for the motor 129 and the solenoid 132 differ only by the fact that the circuit for the motor includes contacts 125 and 126. Opening of these contacts causes stopping of the motor 129 without affecting the operation of the solenoid 132. Simultaneously with the energization and the beginning of the operation of the plugging time delay relay 49 the reverse or plugging contactor relay 46 is closed and effects closing of the reverse or plugging contactor 17. The circuit for the plugging contactor relay 46 may be traced from the line conductor 58 through the conductor 61, the coil of the relay 46, the conductor 127, the contacts 126, 125, the conductor 124, the contacts 103, the interlock 83, and finally through the conductor 73 to the other line conductor 59. Energization of the operating coil 46 causes the closing of the contacts 47, which latter then close the circuit of an operating coil 133 of the plugging contactor 17. The circuit of the coil 133 may be traced from the line conductor 59 through the conductor 73, the contacts 47, the operating coil 133, the conductor 79 and through the conductor 61 to the other line conductor 58. Energization of the operating coil 133 causes closing of the plugging contactor 17, thereby energizing the motors 14 for reverse direction of rotation, thus bringing the motors 14 to a quick stop. This operation continues until the circuit for the plugging contactor relay 46 is opened. This opening is effected after a predetermined period of time which may be 15 seconds and is accomplished by the plugging time delay relay 49. The latter includes a timing gear 134 having a pin 135.

The timing gear is rotated by the motor 129 and after a definite period of time the pin 135 engages a latch 136, effecting unlatching and thereby opening of the contacts 125, 126. This deenergizes the relay 46 and in turn causes opening of the plugging contactor 17. The opening of the plugging contactor 17 closes the contacts 63, thereby establishing a circuit for the telltale lamp 60, which latter lights up, indicating the end of the complete cycle and the readiness of the arrangement or system for another cycle. The system remains at rest with control power available as indicated by the lamp 60 until the operator has removed the treated rayon cakes from the buckets 12 and placed other cakes into the buckets to start a new cycle by again pushing the start push button 40.

At any time during the time that the drum contactor is operating, i. e., from starting until plugging operation starts, the cycle may be stopped by operating the selector switch 41, moving it to "safe-stop" position from the "run" position at which time the equipment is stopped and the telltale light 60 will burn. When this selector switch 41 is moved from "safe-stop" position to "run" position the "start" push button station 40 may be again operated to start the equipment at the point in the cycle where interrupted. This arrangement is used so that if it is necessary for any reason to remove any cakes, the remaining cakes may be processed in the proper time cycle.

With my invention I have accomplished an improved system and arrangement for automatically carrying out the various steps of a process to which materials such as rayon cakes in the course of their manufacture are to be subjected. The period of time of the different steps may be easily varied by changing the lengths of the contacts on the drum contactor and the number of the different steps may be varied by varying the number of contacts on the drum contactor. The arrangement may be manufactured at comparatively low cost as all the devices used are standard articles of manufacture.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

In a processing system for subjecting rayon cakes to a succession of steps, the combination of a drive motor, means including an electric circuit for the motor comprising a line contactor and a plugging contactor for operating the motor and plugging it, means including an electric circuit with a drum contactor and relays for automatically opening and closing in succession a plurality of valves after the line contactor is closed and the motor has reached a certain speed, a pilot motor for driving the drum contactor, and a circuit for the pilot motor including a contactor and time delay relay means having an interlock associated with said line contactor, the arrangement being such that plugging of the motor is effected after the lapse of a predetermined period of time from the start.

HARRY C. UHL.